(12) United States Patent
Jacobson

(10) Patent No.: US 6,767,217 B2
(45) Date of Patent: Jul. 27, 2004

(54) ROTATING ELECTRICAL TRANSFER COMPONENTS

(76) Inventor: Peter E. Jacobson, 4013 W. Marlette Ave., Phoenix, AZ (US) 85019

( * ) Notice: Subject to any disclaimer, the term of this patent is extended or adjusted under 35 U.S.C. 154(b) by 158 days.

(21) Appl. No.: 10/095,855

(22) Filed: Mar. 12, 2002

(65) Prior Publication Data

US 2003/0176082 A1 Sep. 18, 2003

(51) Int. Cl.[7] .............................................. H01R 39/00
(52) U.S. Cl. .......................................... 439/24; 439/25
(58) Field of Search .......................... 439/23–26, 17–21

(56) References Cited

U.S. PATENT DOCUMENTS

| | | | | |
|---|---|---|---|---|
| 3,771,106 A | * | 11/1973 | Matsumoto et al. .......... 439/23 |
| 4,714,819 A | * | 12/1987 | Yamashita ................... 219/216 |
| RE32,805 E | * | 12/1988 | Engelmore et al. ........... 439/26 |
| 4,850,880 A | * | 7/1989 | Zayat et al. .................. 439/11 |
| 5,348,481 A | * | 9/1994 | Ortiz ........................... 439/25 |
| 5,809,136 A | * | 9/1998 | Turner ......................... 379/438 |
| 5,865,629 A | * | 2/1999 | Bernardini .................... 439/26 |
| 6,612,849 B1 | * | 9/2003 | Scott ............................ 439/23 |
| 6,658,729 B2 | * | 12/2003 | Brodsky ....................... 29/832 |

* cited by examiner

*Primary Examiner*—Gary Paumen
(74) *Attorney, Agent, or Firm*—Hayes Soloway PC

(57) ABSTRACT

The present invention is an improved electrical cylindrical circuit collector ring assembly. The assembly includes an axial stack of multiple torodial-shaped spacer members and at least one electrical conductor ring member. The spacer members each include one insulating face and one electrically conductive face. The ring assembly also includes a general adhesive for mounting the insulator face to the ring members and an electrically conductive adhesive for mounting the conductive face to the ring members and for mounting ring members to ring members where applicable. The ring assembly also includes a radial extension on each of the conductive faces of the spacer members beyond the ring member diameter providing for an electrical connecting point. Finally, radial tabs provide lead wire channels and means of improved electrical shielding.

13 Claims, 7 Drawing Sheets

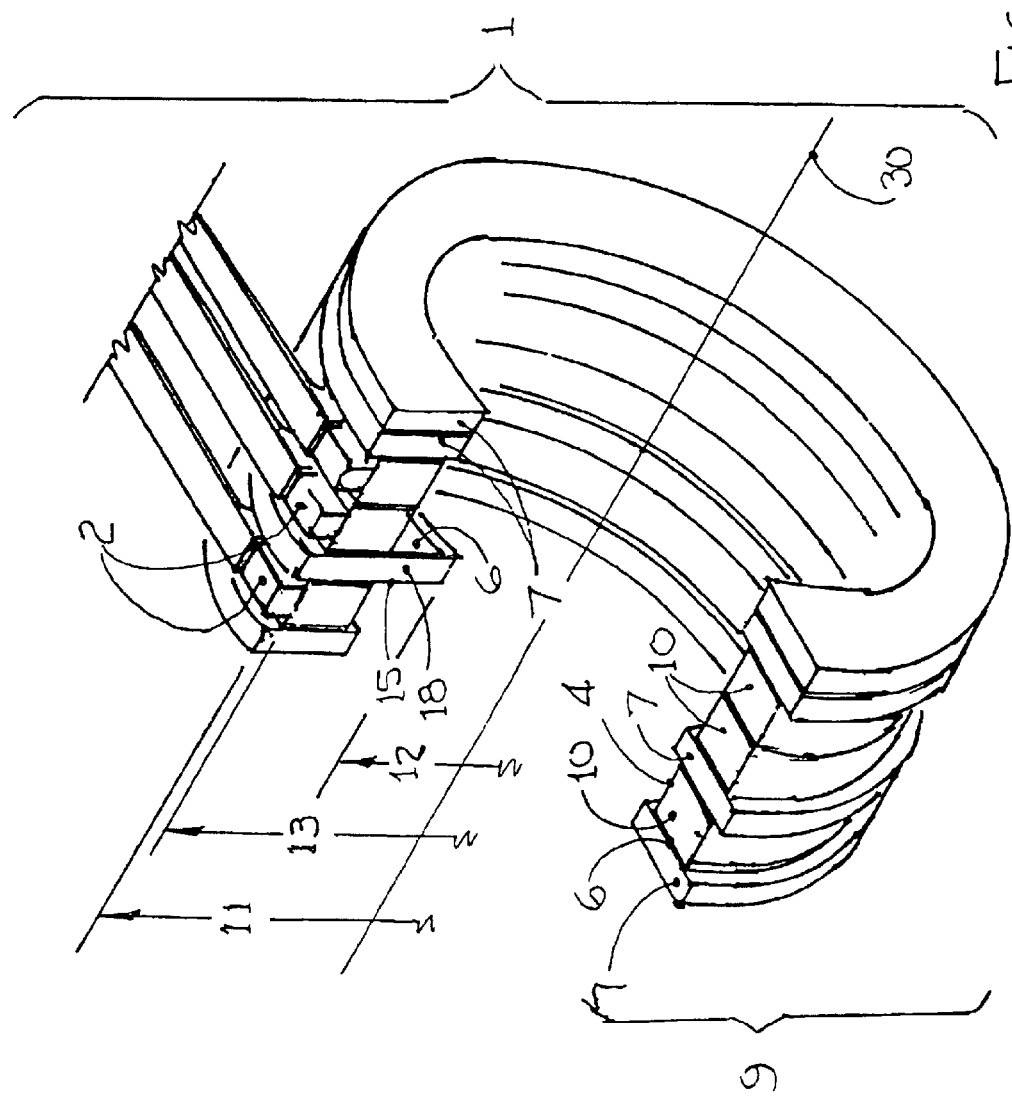

ROTATING ELECTRICAL TRANSFER COMPONENTS

FIELD OF THE INVENTION

This invention relates generally to design, construction, manufacturing cost and performance improvements for multi-circuit cylindrical signal and power electrical connector components used in both sliding and rolling interface transfer mechanisms. More particularly, the invention relates to improved current transfer devices for conducting currents between stator and rotor members of mechanisms where the interface between the two is by means of conventional rolling couplers or by sliding brushes.

BACKGROUND OF THE INVENTION

Slip rings have a long history of applications for the transfer of electrical energy between two mutually rotating members. This transfer is affected by conducting the electrical signals and power from one member to the other through a sliding interface. One or both of these members is cylindrical with the circuit components configured into the cylinder, or cylinders. More recently rolling elements have been introduced at each circuit interface for the same function with rolling instead of sliding conductive components. Recent examples of rolling interface configurations are disclosed in several U.S. Patents. These describe rolling electrical interface configurations for both low level signals and for power transfer. Even the advantages provided by these roll ring transfer units cannot always be realized for some applications because of manufacturing costs and lead times related to the construction process.

The large variety of electrical transfer requirements, specified by the broad field of users introduces another problem for both sliding and rolling transfer, which has both design and cost ramifications. Each new design of the transfer mechanism requires new tooling, fixtures, and molds. This results in long delivery schedules from definition to unit delivery as well as increased manufacturing costs. Since envelope parameters of diameter, length and shape as well as performance requirements of voltage, current, waveform, frequency and electrical resistance noise (or signal quality) establish the design requirements of the transfer unit, each application configuration and design is unique. This situation identifies why new non-recurring design and tooling costs accrue with each new set of specifications.

An existing means of fabricating slip ring sets is to position or mold the rings in place. As the number of circuits increases, and if the rings require machining and plating prior to molding, the total manufacturing costs increase. In an attempt to reduce this cost, the rings are sometimes machined as a molded assembly. This often results in a problem related to loosening of the rings from the molding bond during fabrication with attendant scrap costs. Lead wires connected to the conductive rings are sometimes integrated into the molded assembly. If a wire breaks or looses connection with the ring, or shorts to other wires during the manufacturing process, the entire component must usually be scrapped with obvious cost implications. These considerations result in increased manufacturing costs and force long order-to-delivery time.

One prior art patented configuration consists of stacked sets of rings and spacers to form an axial series of single non-shielded circuits. This design provides annulus channels for rolling interconnection balls between the inner and the outer circuit rings. Although this configuration provides for repeated use of common contact rings and spacers and the elimination of a molding process, which can effect cost reductions, the leads must be attached, and the rings machined and plated, individually. This drives the cost up because of the fact that the majority of plating cost is associated with the labor required to handle individual components. Additionally, the cost of the configuration is adversely affected by the labor required to feed the lead wires through the individual rings and spacers during the assembly process. This configuration does not lend itself to electrical shielding. The assembly complexity and associated high manufacturing cost of the described configuration is easily visualized for transfer units which require >100 circuits.

Another problem associated with the molded assembly technique is the method of attaching the lead wires to the individual circuit rings by molding the wires into the ring support matrix and casting the wire ends into the rings as they are formed by plating. This process does not allow corrections to be made if the lead connection is faulty, or, as is sometimes the case, when the component connection becomes intermittent when the unit is exposed to a cyclic temperature environment.

High voltage insulative resistance requirements are difficult to meet in adjacent circuits when the axial pitch is small. This latter requirement is forced by specifications, which require a large number of circuits in a small axial space. A radially extending barrier between adjacent circuits is required to provide adequate high voltage insulation qualities. This is necessary to increase the path length, which a given contaminant must bridge between adjacent circuits before electrical shorting can occur. Additionally the greater wear debris of slip rings exacerbates the electrical insulative break down problem of adjacent circuits when adequate barriers are not provided. When a rotary transfer mechanism is used in severe environmental conditions, even wiper seals built into the housings are not able to prevent a measure of moisture and contaminants from entering the unit. This often results in electrical bridging between adjacent circuits and electrical insulative failure of the unit if adequate barriers are not provided. Circuit barriers are difficult to mold or machine into the module without breakage because of the small axial thickness which is available in the design. In addition, the barrier must be formed from the same insulating plastic material the rings are set in which results in a brittle, and easily damaged, protective wall. This condition can exist for both slip rings and roll rings.

The inner ring assembly of present rotary electrical transfer mechanisms is characteristically manufactured as a single assembly. Since many transfer unit designs require >100 circuits the probability is high that one or more circuits will be damaged during the manufacturing process. Example sources of this damage are irreversible machining errors, internal shorting in the molded wiring, miswires in the ring connections, broken internal lead/ring connections and ring damage caused by inadvertent contact with a tool or measuring device. Even though the damage may involve only one of many circuits, it will result in scrapping of the entire ring assembly if it cannot be repaired properly and the unit salvaged. The level of expense, both schedule and fiscal, is great enough as to sometimes warrant a reassignment of lead ring connections in the related system to establish a work-around. This is obviously not a desirable solution.

When a high frequency transfer requirement has been defined it is important that proper shielding of the leads to the ring be established. This requires the continuation of the shield on a given lead to a position as close as possible to the ring the lead is attached to. It is usually not possible to use shielded or sleeved wire within a molded assembly since the structural integrity of the lead-to-mold is reduced. This situation reduces the effectiveness of the shielding of the circuits within the assembly. It is also important that the number of connections of each lead from contact ring to the external connector be minimized. When the contact ring is molded into place along with the leads it is often necessary to use solid wire within the molded region of the assembly and to terminate the lead at the perimeter of the molding. This not only necessitates an undesirable additional connection point but a potential failure mechanism since mechanical stress imposed by forces imposed by the external leads, or cables, can fatigue the terminal embedded in the molding.

SUMMARY OF THE INVENTION

It is an object of the present invention to provide improvements of manufacturing cost of both slip ring and roll ring cylindrical electrical transfer sub assemblies associated with tooling and parts cost. This improvement is accomplished by the use of geometrically simple torodial shaped conducting rings, insulators and circuit connection members.

It is an additional object of this invention to provide improvements of subassembly geometry such that the subassembly radial runout errors are less than those of the components from which the subassembly has been made. This situation allows lower cost components to be used for a given set of assembly geometry requirements.

It is another object of the present invention to provide decreased design time of new electrical transfer mechanisms by the use of common components, which may be arranged in a variety of configurations to achieve the desired circuit configurations.

It is yet an additional object of the present invention to decrease manufacturing lead-time of transfer units. This objective can be realized by the modularization of the current transfer components and the use of circuit contact rings and insulating spacers, which have a wide variety of applications.

It is yet another object of the present invention to provide extended operational lifetime of electrical transfer mechanisms associated with reduced sensitivity to wear product and general debris contaminants. This objective is achieved by the construction technique, which allows the use of structurally sound barriers between circuits.

It is yet another object of the present invention to provide reduced environmental sensitivity associated with a greater resistance to circuit to circuit electrical shorting resulting from water, salt spray, oil films or other environmental borne debris by the use of high barriers between circuits.

It is an additional object of the present invention to provide multi-functions of the geometrically simple components such as connecting tabs, which also provide lead wire channels and geometry control.

BRIEF DESCRIPTION OF THE DRAWINGS

The principles of the invention will be most readily understood by reference to a description of preferred embodiments thereof given below in conjunction with the drawings, which are briefly described as follows:

FIG. 1b is an isometric cut-away of a slip ring application using an inner electrical collector ring assembly, which uses the improved construction concepts according to the invention.

DETAILED DESCRIPTION OF THE INVENTION

Figure 1A:
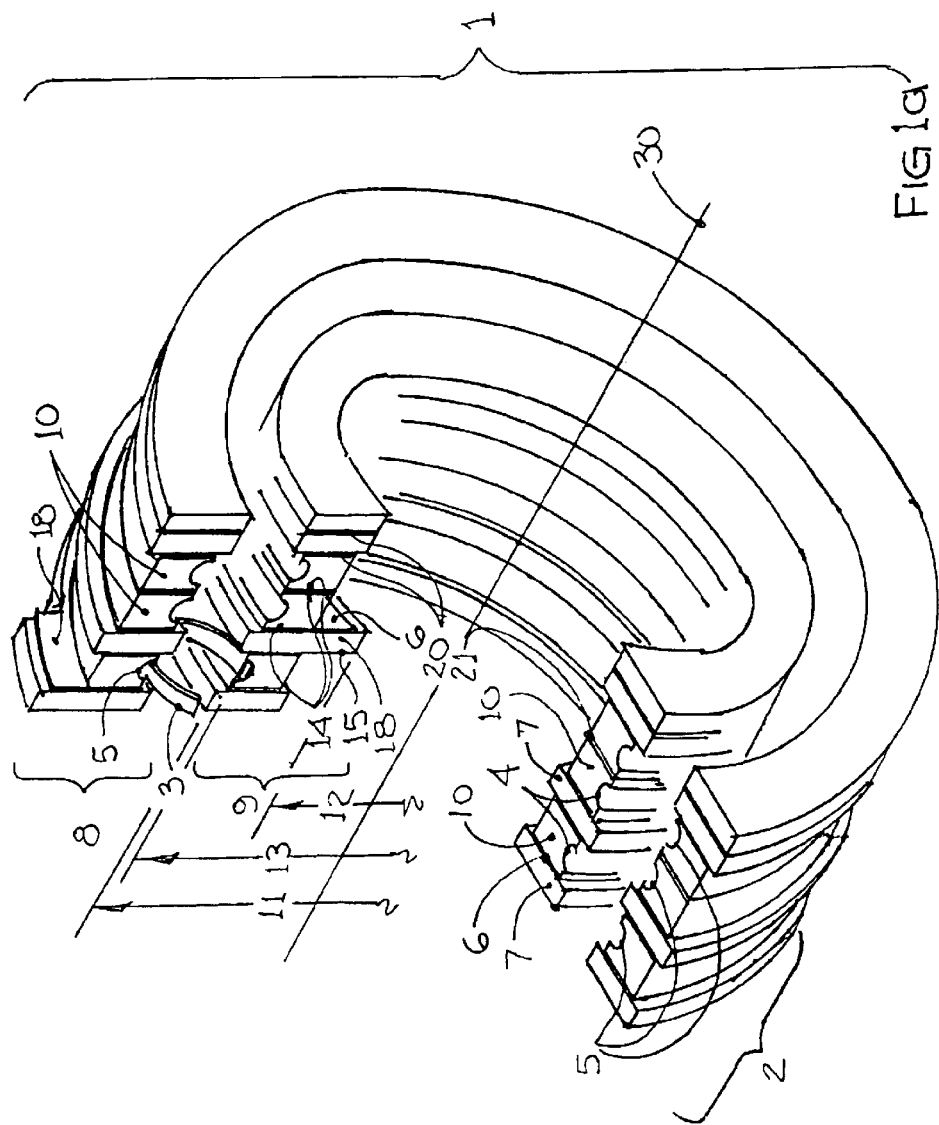
FIG. 1a is an isometric cut-away of a roll ring application using both an inner and an outer electrical collector ring assembly, which use the improved construction concepts according to the invention.

Collector ring assembly 1, made up of an axial stack 2 of inner ring 9 and an outer ring 8 in one embodiment of the present invention, is shown in FIG. 1a as it would be used in a roll ring assembly. Electrical connection between each circuit of the two rings 8, 9 in the roll ring application is provided by multiple flexures or couplers 3, which are captured by inner ring grooves 4 formed in the outer diameter of the inner ring 9 and outer ring grooves 5 in the inner diameter of the outer ring 8. The ring assembly 1 as shown in FIG. 1b represents an application of the present invention, as it would be applied in a slip ring assembly. It is evident from FIGS. 1a and 1b that the collector ring assembly 1 of the present invention has application in both roll ring and in slip ring configurations.

In the present invention, one embodiment of a two-circuit configuration of the collector ring assembly 1 is shown in FIG. 1a. Referring to the inner ring 9 of FIG. 1a, electrically conductive faces 6 are attached by general adhesive 20 or plating to torodial shaped electrical insulator spacer members 7. Each of said faces 6 are radially aligned and attached by bonding with electrically conductive adhesives 21 to the axial faces 14 of each of two torodial shaped electrical conductor ring members 10. Radial alignment is assured by fixturization and assures that the central axis 30, established by common tab mounting diameter 12 defined by radial tabs 18 of said spacer member 7 and said inner ring grooves 4 in said electrical conductor ring members 10 are concentric. The insulator spacer member 7 is attached to the opposite axial face 14 of said conductor ring member 10. Electrical connection to said conductive faces 6 by soldering or other suitable means provides an electrical connection to said conductor ring member 10. Other means of obtaining structural mounting of the components are viable as would be obvious to those skilled in the art. Although not annotated in FIGS. 2, 3, 4, 5, 6, 7a and 7b the details of the outer ring 8 aside from the groove location are similar to those of the inner ring 9.

Figure 2:
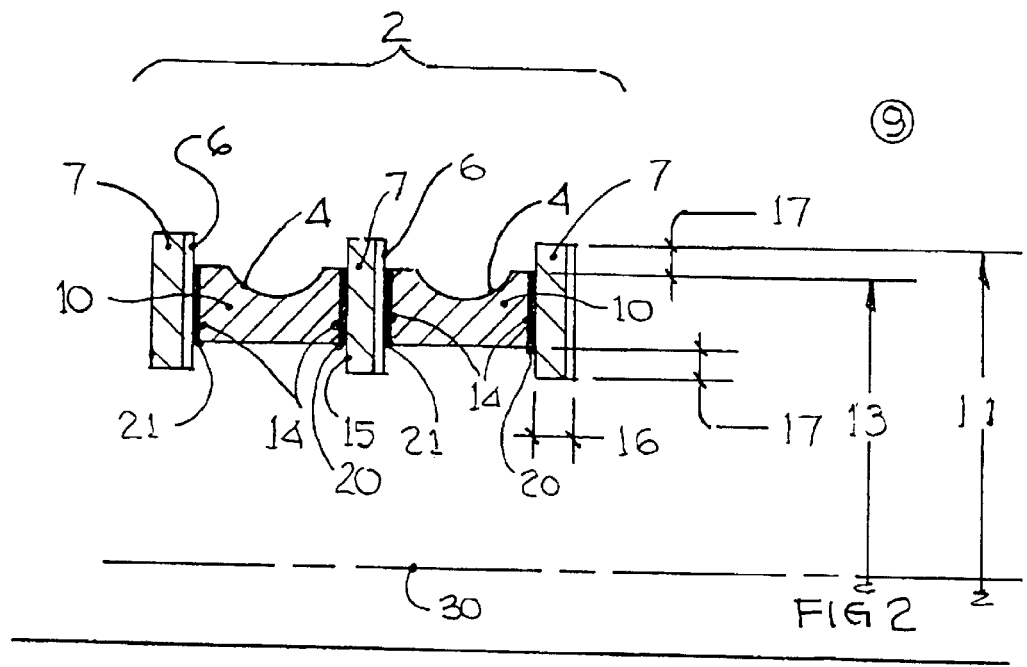
FIG. 2 is a partial half sectional view of an inner collector ring assembly showing single torodial shaped electrical conductor ring members for two transfer circuits and intermediate torodial shaped electrical insulator spacers with conductor faces.

For the present invention, a two-circuit embodiment of an improved inner ring 9 is shown in FIG. 2. The improved collector ring assembly 1 in this embodiment features inner ring 9 as shown and the correlating outer ring 8, not shown, with couplers 3 there between. Electrically conductive face 6 on torodial-shaped spacer member 7 is bonded with electrically conductive adhesive 21 to one axial face 14 on conductor ring member 10. The opposite axial face 14 of said conductor ring member 10 is bonded to the insulating face 15 of said spacer member 7 with general adhesive 20, wherein the general adhesive 20 is defined as having no conductivity requirements. This construction is repeated for each circuit in FIG. 2. Although inner ring grooves 4 formed into a profiled edge in said conductor ring members 10 circumference may be individually machined into the inner ring 9, practice has demonstrated that single machining and plating operations are the most economical. Spacer diameter 11 is designed to be greater than ring diameter 13 to result in radial extension 17 of said spacer 7. The thickness 16 of a given spacer member 7 and the radial extensions 17 of the spacer member 7 are selected to provide proper total distance spacing between separate circuits to satisfy a given high voltage requirement by increasing the leakage path length 23 and to provide a sufficient wear debris wall. The invention collector ring assembly 1 configuration allows an optimum choice to be made for the spacer thickness 16 over that possible with conventional molded and cast manufacturing process and designs. Units have been manufactured in the present invention with spacer thickness 16 ranging from 0.005 inches to 0.250 inches.

Figure 3:
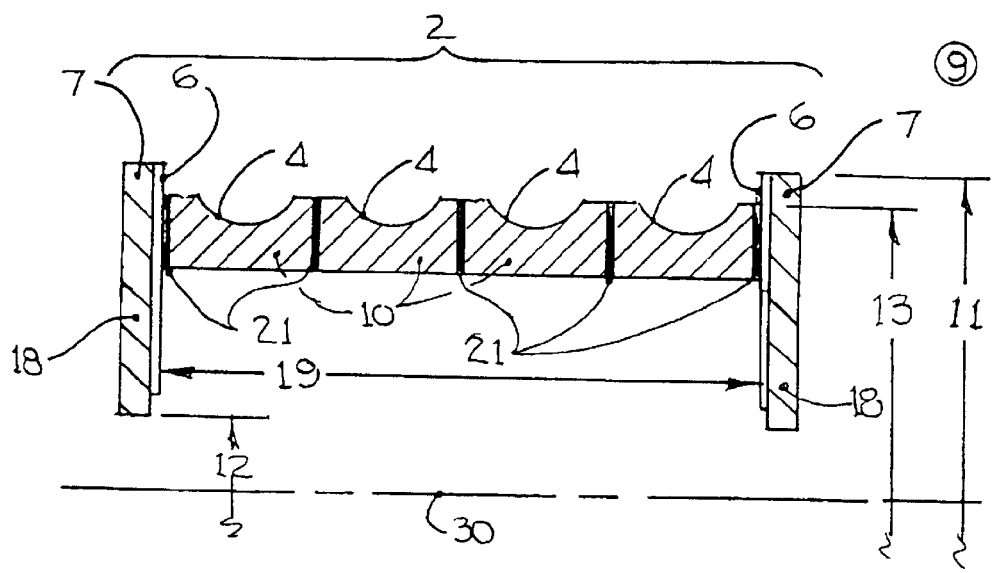
FIG. 3 is a partial half sectional view of an inner collector ring assembly showing multi-grooved torodial shaped electrical conductor ring members for a single power transfer circuit with insulating electrical insulator spacer members.

The configuration in FIG. 3 provides for the transfer of greater current than that of FIG. 2 by the addition of parallel current paths for each transfer circuit. Referring to FIG. 3 a number of said conductor ring members 10 are bonded together with electrically conductive adhesive 21 and that assembly in turn is bonded between conductive faces 6, which are integral parts of said insulator spacer members 7. This configuration provides two conductive faces 6 and two parallel lead wire connections at radial tabs 18 on said faces 6 to accommodate the higher transfer currents. As seen in FIG. 3, joining more than one torodial shaped electrically conductive ring member 10 has the effect of creating a conductive circuit 19 with an axial width that is greater than the axial width of any single conductor ring member 10. This arrangement provided by the embodiment of the present invention allows conductor ring members 10 in FIG. 2 to be used in the arrangement of FIG. 3. It is obvious that alternate numbers of conductor ring members 10 may be so configured to configure alternate said effective conductive ring member designs. The inner ring groove 4 may be machined into said conductor ring members 10 circumference prior to, or after, bonding. The latter procedure achieves greater radial alignment of the outer ring groove 5. This configuration allows a relatively axially-wide conductive circuit 19 to be fabricated out of relatively thin conductor ring members 10 with resultant economical advantages.

Figure 4:
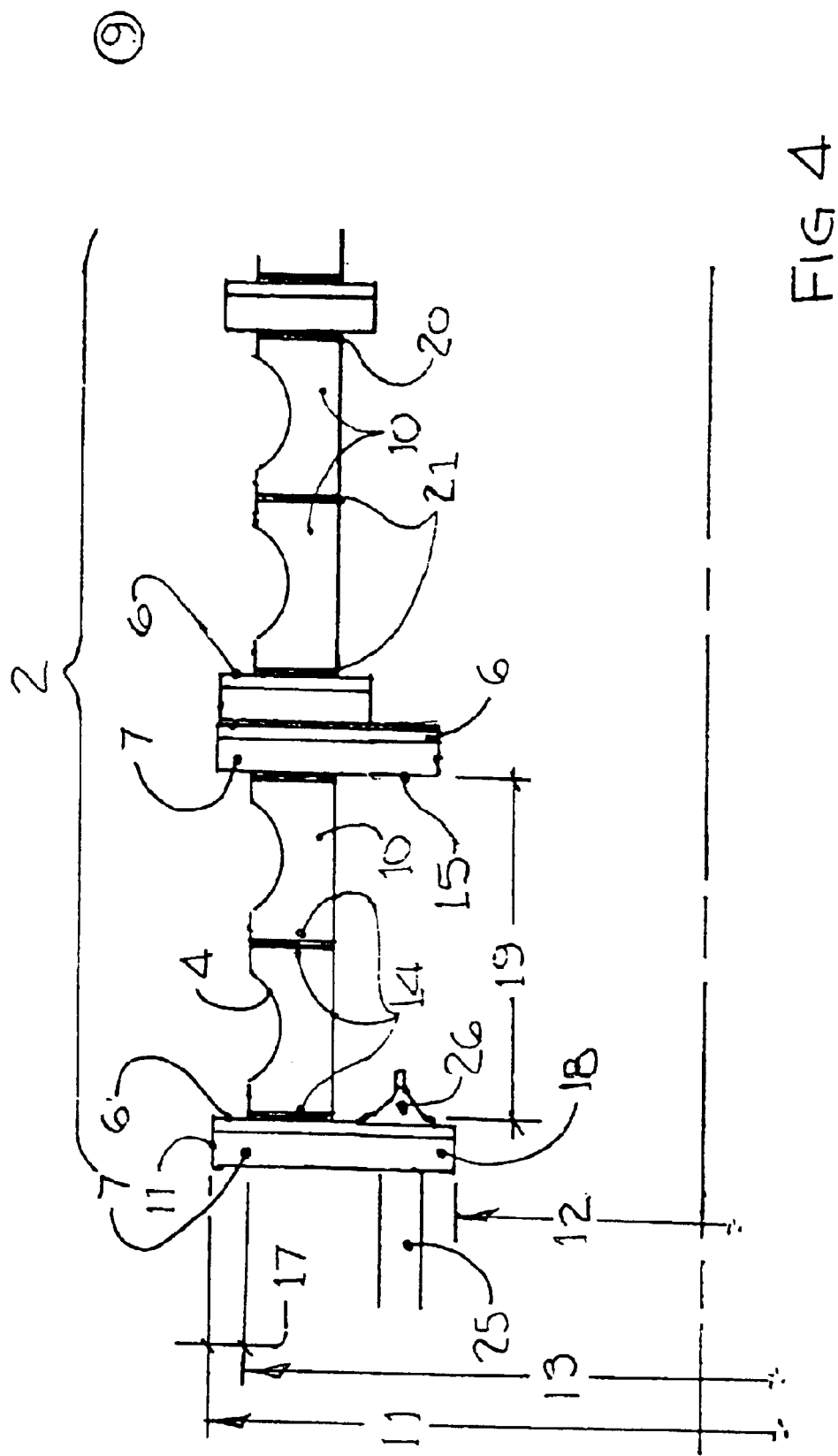
FIG. 4 is a partial sectional view of an inner collector ring assembly showing: multi-grooved electrical conductor rings for two signal transfer circuits; intermediate electrical insulator spacer members; a radial extension on the conductive face; and an additional spacer member and conductive face.

In the present invention an additional embodiment using the same two basic components as FIGS. 2 and 3 is shown in FIG. 4. The configuration shown in this figure provides for an axial stack 2 of two parallel current paths for each of two circuits as well as improved high frequency electrical shielding. Conductor ring members 10 are bonded together to form a wider conductive circuit 19 as described in the narrative of FIG. 3 as well as bonded to conductive face 6 and spacer member 7. A radial tab 18 of said conductive face 6 provides for solder connection 26 of lead wire 25. The conductive adhesive 21 connects the adjacent conductor ring member 10 to conductive face 6. The spacer member 7 is structurally mounted with general adhesive 20 to insulating face 15 on said spacer member 7. The electrically conductive face 6 of an additional said spacer member 7 is not electrically connected to either of said conductor ring members 10 and forms an effective high frequency shield between the two circuits with a provision for ground connection. The axial width 19 of each conductive circuit is approximately two times the width of individual conductor ring members 10. This assembly configuration, of course, may be repeated for additional circuits as well as altered for additional conductor ring members 10 in any given circuit.

Figure 5:
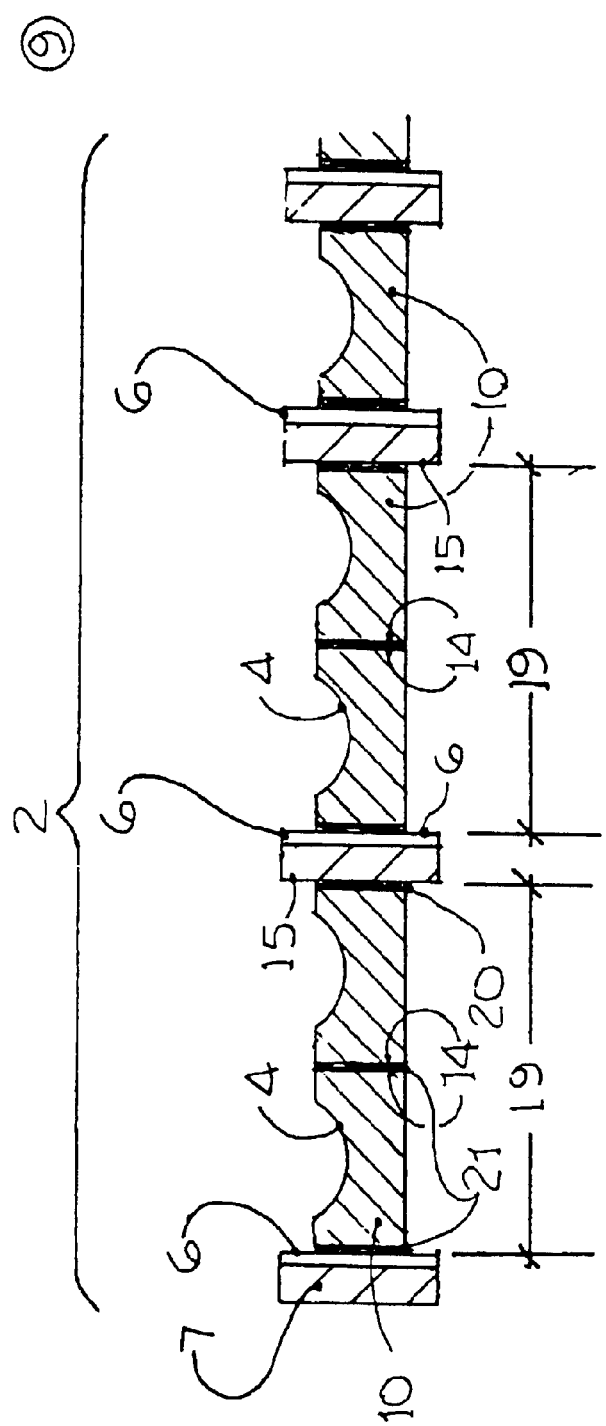
FIG. 5 is a partial half sectional view of an inner collector ring assembly showing both multi-grooved electrical conductor rings for dual coupler transfer and a single grooved electrical conductor ring for single coupler transfer with electrical insulator spacer members and conductive face connectors on each end.

Another embodiment of the improved collector ring assembly 1 of the present invention consists of an axial stack 2 of a variety of conductor ring members 10 such as is shown on inner ring 9 in FIG. 5. In this figure, parallel paths for two sets of two conductor ring members 10 and one single conductor ring member 10 have been configured out of common spacer member 7 and conductor ring member 10 designs. This arrangement is representative of what would be configured for a circuit path using a twisted shielded pair of lead wires 25. From the figure said spacer members 7 with electrically conductive face 6 support and bound said conductor ring members 10. The support is provided by conductive adhesive 21 on said conductive faces 6 of said spacer members 7 as well as on adjoining axial faces 14 of said ring members 10. The spacer members 7 provide structural support for the conductor ring members 10 by both the electrically conductive adhesive 21 at conductive faces 6 and by general adhesive 20 at insulating faces 15 on spacer members 7. It is obvious that electrically conductive adhesive 21 is an acceptable alternative to bonding at both the conductive faces 6 and the insulating faces 15 where it is more economical to use only one adhesive type. Electrically conductive faces 6 on spacer members 7 provide for external lead wire 25 connections to said conductor ring members 10 as is seen in FIG. 4. Alternate arrangements of course are anticipated in the present invention. In FIG. 5 axial widths 19 of the effective conductive circuit is twice as great as the axial width of separate ring members 10. This assembly configuration, of course, may be repeated for additional circuits as well as altered for additional conductor ring members 10 in any given circuit.

FIGS. 2, 3, 4 and 5 identify four of the many current transfer configurations which are possible with the herein disclosed basic spacer member 7 and conductor ring member 10 components with development, fabrication and assembly economical advantages.

Figure 6:
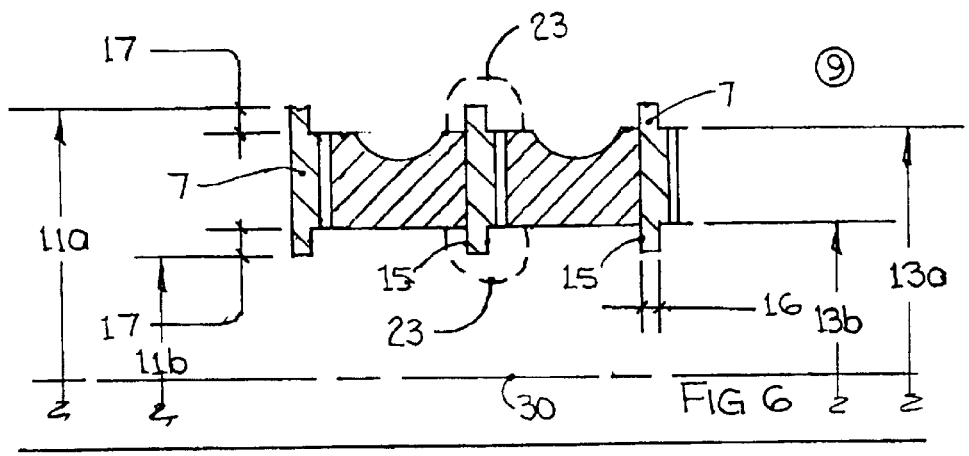
FIG. 6 is a partial half-sectional view of an inner collector ring assembly showing increased inward and outward radial extensions of the electrical insulator spacers which effect a longer leakage current path length, identified in the figure with broken lines, between two adjacent electrical conductor ring members.

Referring to FIG. 6, the present invention includes a means of providing an improved high voltage barrier between adjacent circuits by increasing the leakage path length 23 as well as a barrier to prevent wear or other electrically conductive debris from causing shorts between these two adjacent circuits. From the figure spacer members 7 have an axial thickness 16 and are configured with a spacer diameter 11*a* which is greater than the ring member diameter 13*a* and another spacer diameter 11*b* which is less than said ring member diameter 13*b* to effect both inner and outer radial extensions 17. This extension 17 is provided either before or after said conductor ring member 10 is assembled with said spacer members 7. Since the extensions 17 provide a said path length 23 between two adjacent circuits of said ring members 10 which is expressed as length 23=two× length of radial extension 17+thickness 16. The path length 23 may be adjusted to a safe value by adjustments of the design parameters involved.

Figure 7A:
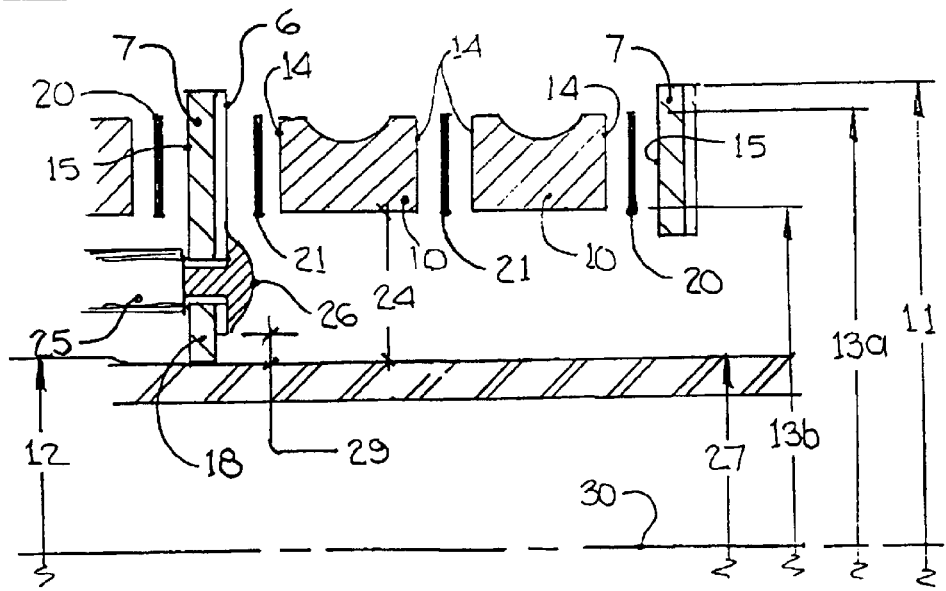
FIG. 7a is a partial half cross-sectional view of an axially exploded inner collector ring assembly showing torodial shaped spacer members-axial electrically conductive faces as connection members, conductor ring members, electrically conductive adhesive components and a lead wire and a radial extension connection tab.
Figure 7B:
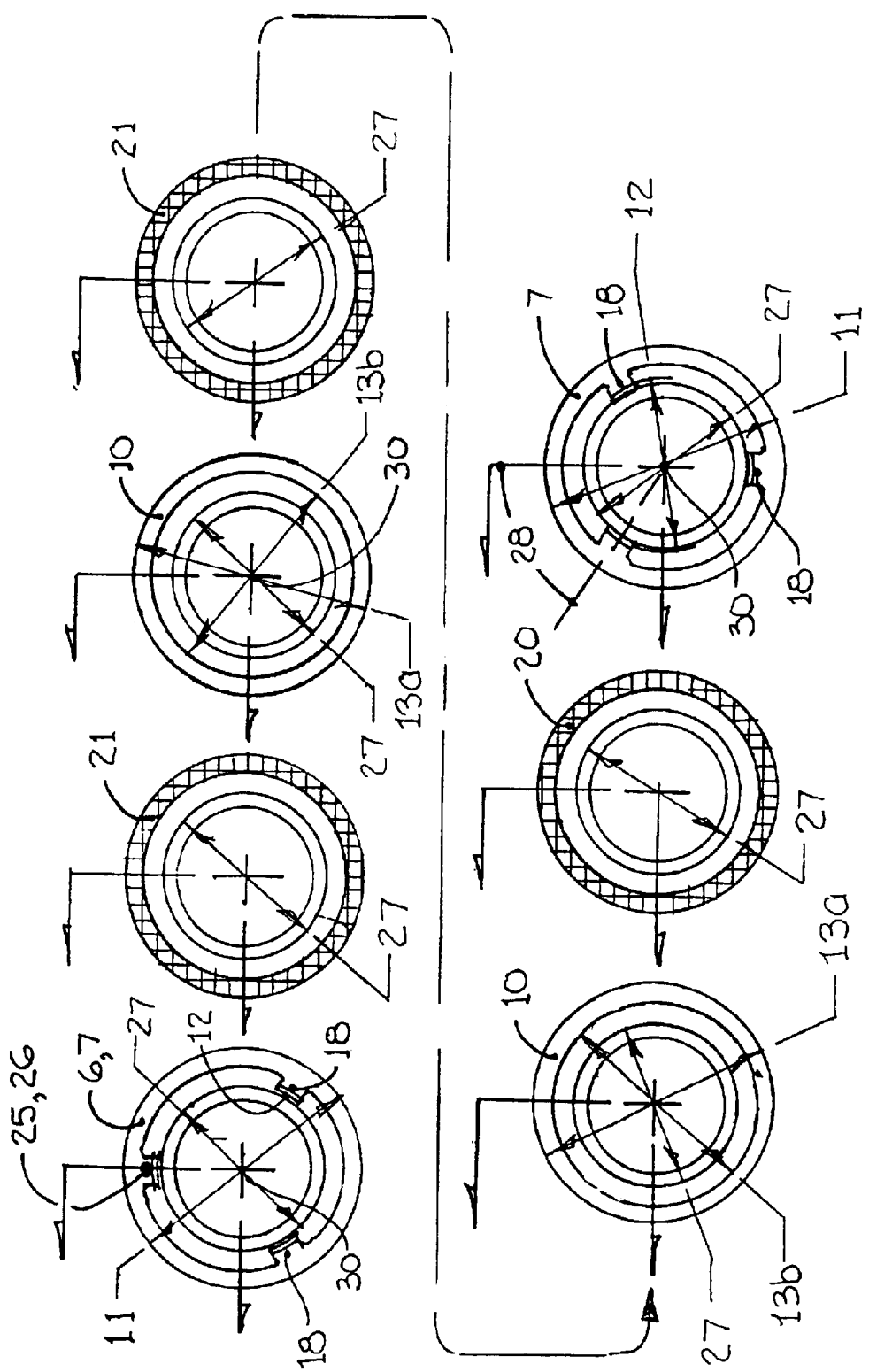
FIG. 7b is a sequential axial view of the components identified in FIG. 7a, identifying the angular orientations of the insulator spacer radial extension position control tabs.

FIGS. 7*a* and 7*b* provide additional clarification of constructive details of one embodiment of the present invention, which has two parallel paths for a single circuit. FIG. 7*a* identifies the components of this embodiment of collector ring assembly 1 inner ring 9 as viewed in a half-sectional, exploded drawing in a plane through the collector ring assembly 1 axis and, from left to right corresponding to the sequence as from upper left to lower right in FIG. 7*b*. In FIG. 7*a* torodial-shaped spacer member 7, which is integral with said conductive face 6, adheres to one axial face 14 of said conductor ring member 10 with electrically conductive adhesive 21. The opposite axial face 14 of said conductor ring member 10 adheres to an axial face 14 of another conductor ring member 10 with electrically conductive adhesive 21. The opposite axial face 14 of the other conductor ring member 10 adheres to an insulating face 15 of another spacer member 7 with general adhesive 20.

Said insulating spacer member 7 is provided with multiple radial tabs 18 in FIG. 7*b*. The tabs 18 are designed to extend radially a radial tab length 24 in FIG. 7*a* between the surface of ring member diameter 13*b* of said conductor ring member 10 and the common tab mounting diameter 12 of spacer member 7. The radial tabs 18 in the present invention provide three functions. The first is to accommodate lead wire 25 electrical connection to tab 18 on conductive face 6 by conventional solder connection 26. A second function of said tabs 18 is to provide a precise radial positioning of said conductor ring members 10 with respect to housing mounting diameter 27, which is provided by a plurality of radially-aligned edges on said spacer 7 which provides a common tab mounting diameter 12. A third function of the tabs 18 is to form a radial annulus space equal to said radial tab lengths 24 for routing lead wires 25 and for electrical shielding between the ring member diameter 13*b* of said conductor ring members 10 and said housing mounting diameter 27, over which the ring assembly 1 is fitted. During the assembly of inner ring 9 and of outer ring 8 said tabs 18 are aligned at a tab alignment angle 28 defined as the relative angular spacing between radial tabs 18 of any two adjacent spacer members 7 in FIG. 7*b*. Said angle 28 is assigned the value 360/(2 N) where N represents the number of said tabs 18 on a given spacer member 7. This arrangement provides for maximum angular space for said lead wires 25. The number of lead wire 25 channels for a given design is equal to twice the number of tabs "N" for uniform spacing of said tabs 18. The electrically conductive face 6 is relieved a radial distance 29 at the end of said tab 18 to avoid electrical contact with said housing mounting diameter 27.

An additional advantage of the component design which may be achieved by the present invention is reduced radial clearance between the common tab mounting diameter 12 formed by a plurality of radially aligned edges of tabs 18 on said spacer 7 and said housing mounting diameter 27 after the electrical collector assembly is complete. This assures optimum radial control of the inner ring inner ring grooves 4 and the outer ring grooves 5 with respect to the housing mounting diameter 27. Referring to FIG. 7*b*, this is achieved during the stacking and adhesive bonding of components as they are stacked inside, or over, tooling rings, which have been fabricated to offer a diameter equal to the distance from the central axis to the outer, or inner, housing mounting diameter 27. As each said spacer member 7 is positioned in the fixture, it is radially biased alternately along a selected diametrical axis removing all radial clearance of each item. This radial clearance is one half the difference of the distance from central axis 30 to the housing mounting diameter 27 and said common tab mounting diameter 12. After adhesive bonding is complete and the collector ring assembly 1 is removed from the fixture the resultant fit of the ring assembly 1 to the housing mounting diameter 27 in FIG. 7*a* is a zero clearance. Zero clearance is the result of making said common tab mounting diameter 12 and the housing mounting diameter 27 equal. This result is independent of the radial clearance with respect to said mounting diameter 27 of said tabs 18 of each spacer member 7 in FIG. 7*b*.

The principles of the present invention have been described here in by describing a number of preferred embodiments. It is to be understood that these described embodiments can be modified or changed while remaining within the scope of the invention as defined by the appended claims.

We claim:

1. An improved electrical cylindrical circuit collector ring assembly comprising:

an axial stack of a plurality of torodial-shaped spacer members and at least one torodial-shaped electrical conductor ring member, wherein the spacer members each include one insulating face and one electrically conductive face;

a general adhesive attaching the insulating faces to the ring members;

an electrically conductive adhesive attaching the conductive faces to the ring members; and a radial extension on the conductive face of at least one of the spacer members thereby providing at least one electrical connecting point.

2. The assembly of claim 1 further comprising a plurality of torodial-shaped electrical conductor ring members wherein the electrically conductive adhesive attaches ring members to ring members within the axial stack whereby the adjoining faces of the additional ring members provides an increased axial width of a conductive circuit while maintaining use of common ring members.

3. The assembly of claim 1 further comprising a plurality of torodial-shaped electrical conductor ring members wherein one spacer member is located between two ring members thereby providing for a plurality of circuits.

4. The assembly of claim 1 wherein the radial extensions each include a plurality of radial tabs.

5. The assembly of claim 4 wherein the tabs contain at least one electrical connecting point.

6. The assembly of claim 5 wherein the tabs are prefabricated on the spacer members.

7. The assembly of claim 5 wherein the conductive faces are radially relieved on at least one common tab-mounting diameter thereby providing increased dielectric strength between the assembly and the housing.

8. The assembly of claim 4 further comprising a circumferential angular arrangement of the tabs with respect to the ring assembly thereby providing lead wire channels with mechanical protection and electrical shielding between individual leads and between the leads and external members.

9. The assembly of claim 8 wherein the tabs are radially positioned thereby eliminating an effect of manufacturing size tolerances of an effective common tab-mounting diameter of the spacers.

10. The assembly of claim 1 wherein a spacer diameter is selected with respect to a ring member diameter to provide increased radial projections thereby increasing debris-shorting and high voltage arcing protection between adjacent collector ring circuits.

11. The assembly of claim 1 further comprising:
- a profiled edge on all the ring members on a ring member circumference; and
- a plurality of radially-aligned edges on the spacer members to create a common tab-mounting diameter whereby the assembly is mountable in a housing.

12. An improved electrical cylindrical circuit collector ring assembly comprising:
- a plurality of spacer members, wherein each of the spacer members includes at least one insulating face and at least one spacer member includes one electrically conductive face;
- at least one electrical conductor ring member;
- a general adhesive axially attaching at least one of the insulator faces to at least one of the ring members;
- an electrically conductive adhesive axially attaching at least one of the conductive faces to at least one of the ring members; and
- a radial extension on at least one of the conductive faces of the spacer members thereby providing at least one electrical connecting point.

13. The assembly of claim 12 wherein the at least one electrical conductor ring member is a plurality of electrical conductor ring members and the electrically conductive adhesive is axially attaching at least two of the ring members.

* * * * *